(No Model.)
J. RIDDELL.
COMPOSITE PINION.
No. 464,896.　　　　　　　　　Patented Dec. 8, 1891.
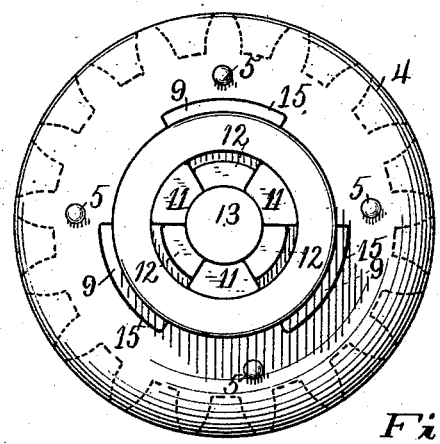
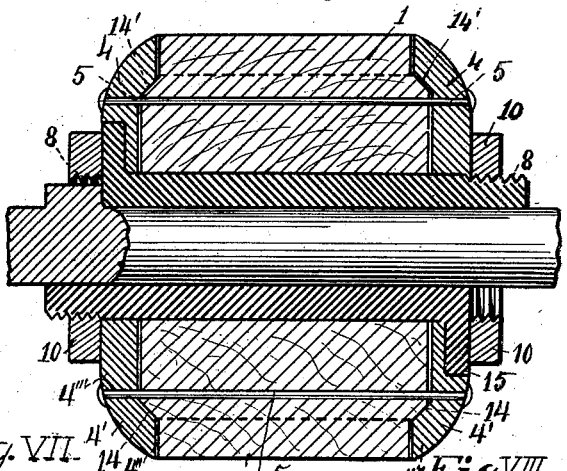
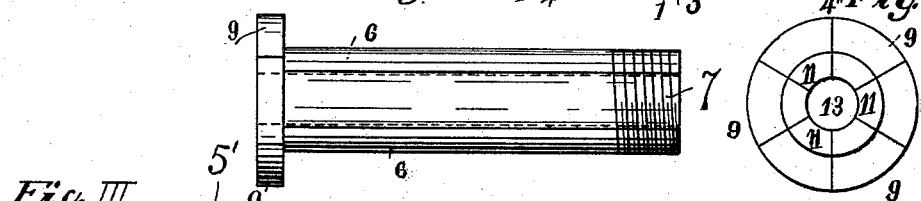
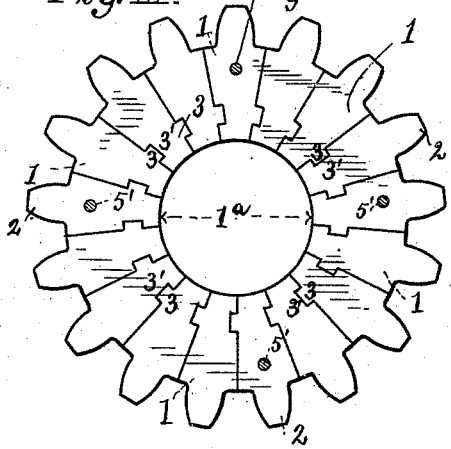
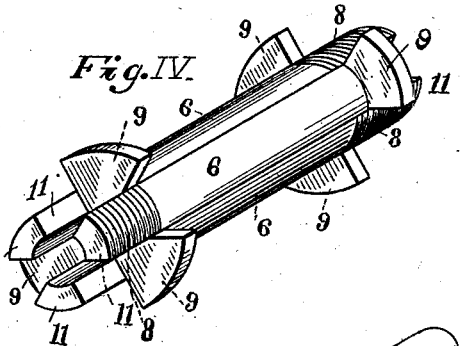
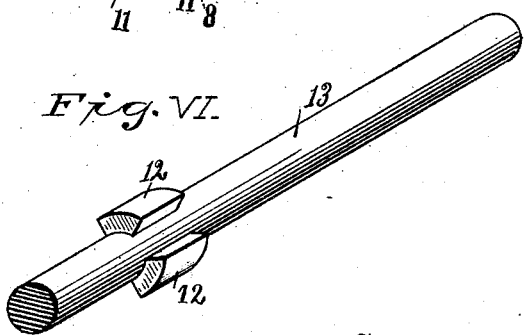
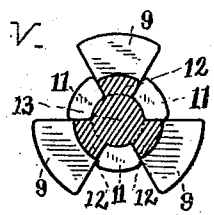
Witnesses
H. A. Lantz
G. F. Grummond
Inventor
John Riddell
By Knight Bros.
Attorneys
THE NORRIS PETERS CO., PHOTO-LITHO., WASHINGTON, D. C.

UNITED STATES PATENT OFFICE.

JOHN RIDDELL, OF LYNN, ASSIGNOR OF ONE-HALF TO GUYON F. GREENWOOD, OF BOSTON, MASSACHUSETTS.

COMPOSITE PINION.

SPECIFICATION forming part of Letters Patent No. 464,896, dated December 8, 1891.

Application filed May 20, 1891. Serial No. 393,465. (No model.)

*To all whom it may concern:*

Be it known that I, JOHN RIDDELL, a citizen of the United States, residing at Lynn, Essex county, Massachusetts, have invented a new and useful Improvement in Composite Pinions, &c., of which the following is a specification.

My invention relates to a new and useful construction applicable to a pinion, hub, sheave, pulley, polishing-wheel, or other like circular and rotary object in which a cylindrically-disposed group of sectors of some suitable non-metallic substance—such as wood, rawhide, leather, papier-maché, or vulcanized fiber—is combined with a pair of metallic cheeks or collars and with a bushing and a shaft or spindle.

In the herein-described preferred form of my improvement the contiguous faces of the sectors have interlocking projections and recesses, and there is interposed between the shaft and the aforesaid cylindrical body a metallic bushing of peculiar construction, which interlocks internally with the shaft and externally with the collars. The collars are so formed as to compress the body-sectors into a compact cylindrical mass upon the bushing. Tie-rods that pass through the body and the collars operate to secure this compression and to hold all the parts compactly together.

My invention has been especially designed for and will be described in its application to a composite pinion.

Referring to the accompanying drawings, which form a part of this specification, Figure I is an end view, and Fig. II is an axial section, of a composite pinion constructed in accordance with my invention. Fig. III is an end view of the body portion. Fig. IV is a perspective view of the bushing. Fig. V is a transverse section of same. Fig. VI is a perspective view of the shaft or spindle. Fig. VII is a side view of part of the bushing. Fig. VIII is an end view of the same.

The body is composed of wood or other suitable non-metallic material and is made up of a group of identically-formed sectors 1, whose contiguous sides are so beveled as when assembled, as shown in Fig. III, to constitute the represented compact cylindrical mass. Each sector having on one of its said beveled surfaces a tongue 3 and on its other beveled surface a corresponding groove 3', the sectors when assembled interlock, as shown in Fig. III. When designed for a pinion, as in the present illustration, each sector terminates exteriorly in a cog 2, whose form and dimensions are such that the assembled group of sectors shall present the form of a suitable pinion-gearing. The sectors have beveled shoulders 14 for a purpose presently explained. A certain number—say four—of the sectors have longitudinal orifices 5' for a purpose also hereinafter explained. The dimensions of the sectors 1 are such that their inner edges, when assembled, present a circular bore or central orifice 1ª.

4 are two similar metal cheeks or collars having internal flanges 4', whose bevel inner shoulders 14' fit the shoulders 14 of the assembled sectors, and whose rims 4" abut against and protect the ends of the teeth 2, as shown in Fig. II. Opposite the orifices 5' in the body the said collars 4 are perforated at 4''' for rods 5, which, being passed clear through the body and collars, are riveted outside the latter, as shown in Fig. II. The effect of this construction is to oblige the body and collars to rotate together as one. The riveting of the rods 5 causes the bevel surfaces 14 of the collars to press tightly around the bevel shoulders of the sectors, so as to bind and hold said sectors firmly in a compact body to one another and upon the bushing now to be described.

I provide a group of any even number—say six—metallic staves 6, of which each has a toe 9 at one end and a screw-thread 8 at the other end. These staves are assembled in the alternately-reversed positions shown in Fig. IV, so that each end has three lugs and extending between and beyond them three projecting screw-threaded tongues 11. The dimensions are such that the outer sides of the assembled staves snugly fill the central orifice 1ª of the grouped sectors, while the interior orifice formed by the grouping of said staves 6 fits the shaft or spindle 13.

10 are nuts that engage with the screw-threaded portions 8. The said screw-threaded portions are tapered outward, so that as the nuts are forced home the staves are caused to firmly embrace the shaft. Three keys or projections 12 on the shaft 13 engage between the tongues 11 of the bushing, and the toes 9 of the bushing in like manner engage in key seats or sockets 15, of which three are formed in the outer face of each collar.

Inasmuch as the shaft projections 12 engage between the tongues 11 of the bushing and the toes 9 of the latter engage in sockets 15 of the collars 4, which collars are fastened to the body by means of the riveted rods 5, it will be seen that all those parts are compelled to rotate together as if of a single solid piece.

When desired, the wheel or pinion proper, composed of the body with its collars and riveted rods may be readily removed by unscrewing the nuts 10 and withdrawing endwise the staves 6 that compose the bushing. This facility of removal enables a new pinion to be substituted for a worn or damaged one, and such substituted wheel or pinion may be of the same identical or any different dimension or pattern. A coarser pinion of same diameter may be produced by having cogs on the alternate sectors only and of twice the pitch, height, and thickness.

For a simple pulley or a polishing-wheel the same construction may be employed, the teeth only being omitted.

Having thus described my invention, the following is what I claim as new therein and desire to secure by Letters Patent—

1. In a composite pinion, the combination of a body composed of a cylindrical group of non-metallic interlocking sectors, a pair of clamping-collars having suitable key-seats and having beveled shoulders which embrace said body, and tie-rods which pass through said body and said collars and are riveted outside the latter.

2. A composite wheel which consists of the combination of a body composed of a cylindrical group of non-metallic interlocking sectors, a pair of clamping-collars having suitable key-seats and having beveled shoulders that embrace said body, tie-rods which pass through said body and said collars and are riveted outside the latter, a longitudinally-divided bushing having alternately-reversed staves with toe and screw-thread at the respective stave ends, said toes occupying the key-seats in the collars, a shaft having key projections that engage between said stave ends, and nuts which engage upon said screw-threads, substantially as set forth.

3. In a wheel, the sectional bushing having alternate screw-threaded tongues 11 and toes 9, substantially as set forth.

4. In a wheel, the combination, with shaft 13, having key projections 12, of the sectional bushing having alternate screw-threaded tongues 11, which inclose said key projections, and nuts 10, which engage upon said screw-threaded tongues, substantially as set forth.

JNO. RIDDELL.

Witnesses:
EDWIN P. BUTTERFIELD,
WM. D. ROE.